United States Patent

Hsu et al.

[11] Patent Number: 5,982,943
[45] Date of Patent: Nov. 9, 1999

[54] METHOD FOR DETERMINING BACKGROUND OR OBJECT PIXEL FOR DIGITIZING IMAGE DATA

[75] Inventors: Wen-Hsing Hsu; Jang-Daw Yang, both of Hsin-Chu, Taiwan

[73] Assignee: Startek Eng. Inc., Hsin-Chu

[21] Appl. No.: 08/834,249

[22] Filed: Apr. 15, 1997

Related U.S. Application Data

[63] Continuation-in-part of application No. 08/395,156, Feb. 27, 1995, abandoned, which is a continuation of application No. 07/944,244, Sep. 14, 1992, abandoned.

[51] Int. Cl.$^6$ .................................................. G06K 9/38
[52] U.S. Cl. ..................... 382/270; 358/462; 358/466
[58] Field of Search .................. 382/270, 271, 382/272, 273; 358/462, 463, 465, 466

[56] References Cited

U.S. PATENT DOCUMENTS

| | | | |
|---|---|---|---|
| 4,490,853 | 12/1984 | Nally et al. | 382/270 |
| 4,509,195 | 4/1985 | Nadler | 358/284 |
| 4,685,145 | 8/1987 | Schiller | 382/52 |
| 4,710,963 | 12/1987 | Chapman et al. | 382/50 |
| 4,809,349 | 2/1989 | Herby et al. | 382/50 |
| 4,856,075 | 8/1989 | Smith | 382/50 |
| 4,908,875 | 3/1990 | Assael et al. | 358/466 |
| 4,953,114 | 8/1990 | Sato | 382/50 |
| 5,001,767 | 3/1991 | Yoneda et al. | 382/50 |
| 5,138,671 | 8/1992 | Yokoyama | 358/466 |
| 5,296,940 | 3/1994 | Kawa Shima | 382/51 |
| 5,568,571 | 10/1996 | Willis et al. | 382/271 |
| 5,703,971 | 12/1997 | Asimopoulos et al. | 382/273 |
| 5,751,850 | 5/1998 | Rindtorff | 382/178 |

FOREIGN PATENT DOCUMENTS

| | | | |
|---|---|---|---|
| 20183 | 11/1992 | WIPO | H04N 1/40 |

*Primary Examiner*—Amelia Au
*Assistant Examiner*—Jingge Wu
*Attorney, Agent, or Firm*—Bacon & Thomas

[57] ABSTRACT

A method for determining whether a pixel of a digitized image is a background or object pixel includes the steps of determining whether the pixel is in a static state or a transient state according to the variation in its gray-level compared with the gray-level of an adjacent pixel located in a first direction, setting a static threshold if the pixel is in the static state or a dynamic threshold if the pixel is in the transient state, comparing the gray-level of the pixel and the applicable threshold to determine whether the pixel is a background or object pixel, and repeating the determination with respect to static or dynamic thresholds, as applicable, in a second direction.

11 Claims, 16 Drawing Sheets

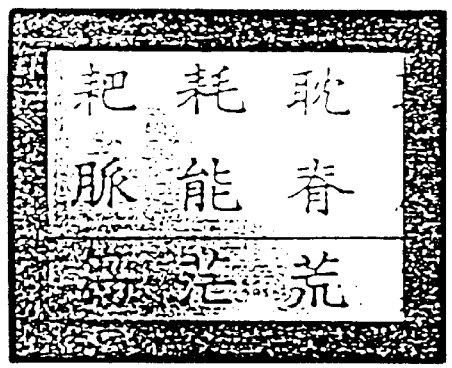 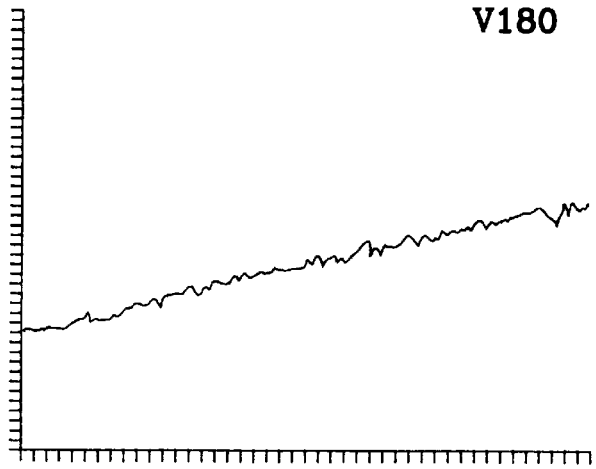
FIG. 2(a)     FIG. 2(b)
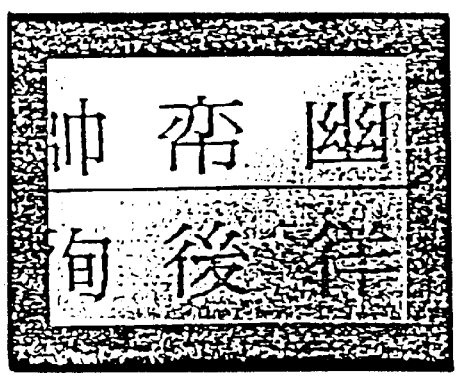 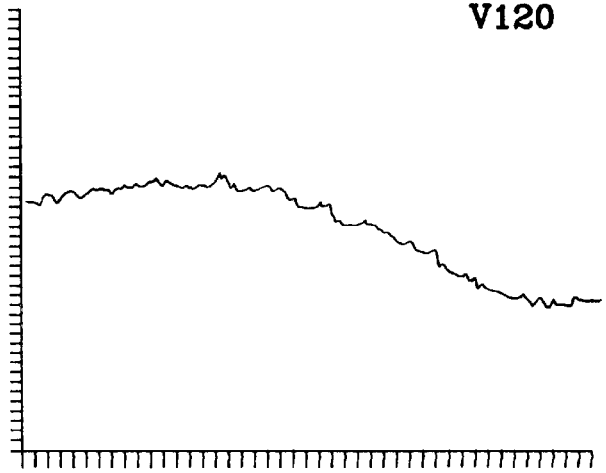
FIG. 3(a)     FIG. 3(b)

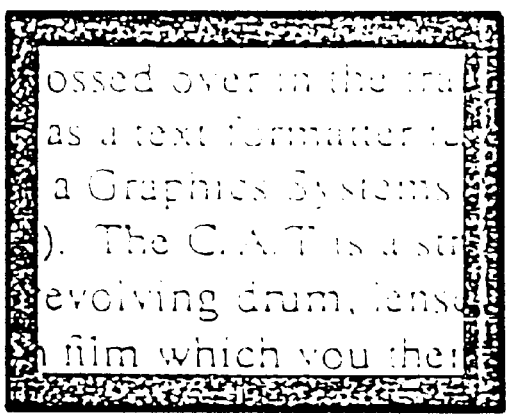 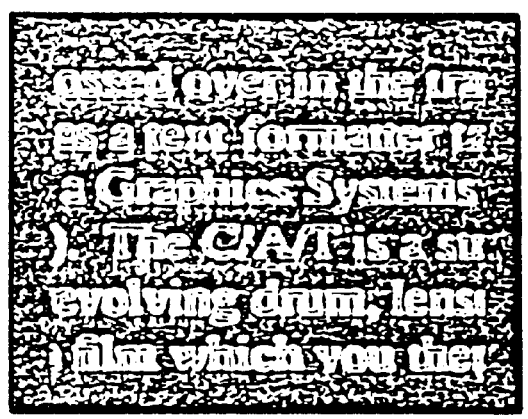
FIG. 4(a)  FIG. 4(b)
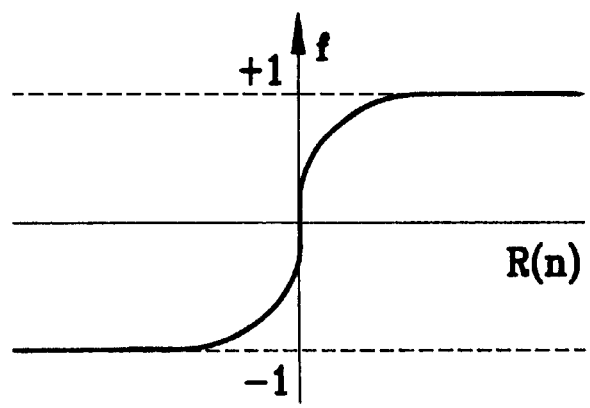
FIG. 5

Table 1. The Statistical Measurements of the absolute horizontal difference of images

| Image i.d. | Mean | Standard Deviation | i+ | X_CFD(i) |
|---|---|---|---|---|
| 1. | 0.896 | 0.721 | 3 | 0.75 |
| 2. | 2.012 | 1.509 | 7 | 0.77 |
| 3. | 0.448 | 0.444 | 2 | 0.74 |
| 4. | 2.869 | 2.045 | 9 | 0.78 |
| 5. | 1.739 | 1.412 | 6 | 0.75 |
| 6. | 1.458 | 1.192 | 5 | 0.76 |
| 7. | 1.687 | 1.384 | 6 | 0.75 |
| 8. | 1.507 | 1.212 | 5 | 0.76 |
| 9. | 1.712 | 1.275 | 6 | 0.79 |
| 10. | 1.666 | 1.263 | 5 | 0.77 |
| 11. | 1.719 | 1.228 | 5 | 0.79 |
| 12. | 1.479 | 1.364 | 6 | 0.75 |
| 13. | 2.363 | 1.749 | 8 | 0.77 |
| 14. | 2.086 | 1.541 | 7 | 0.79 |
| 15. | 2.653 | 1.831 | 8 | 0.79 |
| 16. | 2.577 | 1.822 | 8 | 0.79 |
| 17. | 1.638 | 1.256 | 5 | 0.79 |
| 18. | 1.944 | 1.475 | 6 | 0.78 |
| mean | 1.803 | 1.374 | 6 | |

+i is the closest integer of the value (mean+3*standard deviation)

FIG. 17

Table 1. The Statistical Measurements of the absolute horizontal difference of images

| Image i.d. | Mean | Standard Deviation | i+ | X_CFD(i) |
|---|---|---|---|---|
| 1. | 0.896 | 0.721 | 3 | 0.75 |
| 2. | 2.012 | 1.509 | 7 | 0.77 |
| 3. | 0.448 | 0.444 | 2 | 0.74 |
| 4. | 2.869 | 2.045 | 9 | 0.78 |
| 5. | 1.739 | 1.412 | 6 | 0.75 |
| 6. | 1.458 | 1.192 | 5 | 0.76 |
| 7. | 1.687 | 1.384 | 6 | 0.75 |
| 8. | 1.507 | 1.212 | 5 | 0.76 |
| 9. | 1.712 | 1.275 | 6 | 0.79 |
| 10. | 1.666 | 1.263 | 5 | 0.77 |
| 11. | 1.719 | 1.228 | 5 | 0.79 |
| 12. | 1.479 | 1.364 | 6 | 0.75 |
| 13. | 2.363 | 1.749 | 8 | 0.77 |
| 14. | 2.086 | 1.541 | 7 | 0.79 |
| 15. | 2.653 | 1.831 | 8 | 0.79 |
| 16. | 2.577 | 1.822 | 8 | 0.79 |
| 17. | 1.638 | 1.256 | 5 | 0.79 |
| 18. | 1.944 | 1.475 | 6 | 0.78 |
| mean | 1.803 | 1.374 | 6 | |

+i is the closest integer of the value (mean+3*standard deviation)

FIG. 18

METHOD FOR DETERMINING BACKGROUND OR OBJECT PIXEL FOR DIGITIZING IMAGE DATA

This application is a Continuation-In-Part of U.S. patent application Ser. No. 08/395,156, filed Feb. 27, 1995, now abandoned, which is a Continuation of U.S. patent application Ser. No. 07/944,244, filed Sep. 14, 1992, now abandoned.

FIELD OF THE INVENTION

The present invention relates to a method for separating object pixels from background pixels in image data files, and in particular to a method which uses static and dynamic thresholds to separate object pixels from background pixels in image data files obtained under non-optimal illumination conditions.

BACKGROUND OF THE INVENTION

In the processing of digitized image data for use in such applications as optical character recognition (OCR) and fingerprint recognition, the image is first digitized and the "object" pixels of the digitized image are separated from the image so that the "object" pixels can be processed.

The term "object pixels" as used in the description of this invention refers to pixels in an image file that represent the "image" to be processed, as opposed to "background." What is considered to be the image will change depending on the application, but the "object" pixels are always defined as the pixels to be separated and processed following separation.

FIG. 2(a) and FIG. 3(a) illustrates two images of printed documents, each containing several Chinese characters, as digitized by an image scanner. In the figures, the pixels representing components of the Chinese characters are defined as "objects" and the rest are "background". In this type of image, the "object" pixels are always those pixels with lower gray levels (darker) and the "background" pixels are those with higher gray levels (lighter). In the most common implementation, the grayness of the pixels is divided into 256 levels, with the "object" pixels considered to be those with gray level of "00" and the "background" pixels defined as those with gray level of "FF."

In the digitization of an image, a CCD (charge coupler device) camera or an image scanner is used to scan the image. The image to be processed sometimes is affixed to an object or a piece of paper. If the object or the paper is scanned under natural illumination conditions, noise will be included in the image data so obtained, as shown in FIGS. 2(a) and 3(a).

The conventional method of determining whether a pixel is a "background" or "object" pixel is to use a constant or static threshold. As shown in FIGS. 2(a) and 3(a), some pixels that should be "background" are represented with a lower gray levels due to the effects of noise, and during processing of the image, are treated as "object" pixels, leading to undesired processing results. Consequently, it is necessary to minimize the number of noise pixels before an image file can be processed so that correct processing may be conducted.

The image data obtained by the CCD camera or an image scanner is treated as a two-dimensional matrix in which each component represents the coordinate and the gray level of a pixel. FIG. 1 shows a rectangular coordinate system suitable for use in the representation of an image file, and in which the original point is at the most upper left corner. If the gray level of the pixel at coordinate (x,y) is g(x,y), the relationship of the gray level of the pixel to the illumination function i(x, y) at the scanning and the reflection function of the medium (the paper or the object) r(x, y) can then be expressed by the following equation:

$$g(x,y)=i(x,y) \qquad (1)$$

In this equation, $0<i(x,y)\leq\infty$ and $0<r(x,y)\leq 1$.

Even if the reflection does not create any noise in the gray levels, for example in the case of images printed on a smooth piece of paper with high quality printing, when the images are scanned under natural illumination, the unevenness of the illumination at the time axis may still add a significant amount of noise to the image. FIG. 2(a) and FIG. 3(a) illustrate two images as scanned under natural illumination conditions. The gray levels of pixels at the 180th line from the top of FIG. 2(a) and that of the 120th line from the top of FIG. 3(a) are shown in FIGS. 2(b) and 3(b). As can be seen in the figures, some background pixels have the gray levels far lower (darker) than the average gray level of the background pixels, and thus the gray levels of the "background" pixels vary over a very large scale. If a constant or static threshold is used to decide whether a pixel is object of background, inaccurate results may be expected.

The digital image processing industry is thus in need of a novel method to determine whether a pixel is an object or background pixel when the image to which the pixel belongs is obtained under natural illumination. It is also necessary to provide a dynamic threshold that can determine a pixel to be object or background according to the characteristics of the surrounding pixels.

OBJECTIVES OF THE INVENTION

It is thus an object of this invention to provide a method for separating object pixels from background pixels for an image obtained under natural illumination.

A further object of this invention is to provide a method for eliminating deterioration of an image file obtained under natural illuminations Another object of this invention is to provide a method of establishing dynamic thresholds to determine whether a pixel is an object or background pixel according to the characteristics of its surrounding pixels.

SUMMARY OF THE INVENTION

According to one preferred embodiment of the invention, the invention makes use of the discovery that, even though the range of variation may be great, the variation in the gray levels of background pixels attributable to non-ideal illumination is nevertheless smooth and continuous. Referring, by way of example, to FIGS. 2(a), 2(b), 3(a) and 3(b), it will be noted that the horizontal lines in the individual figures do not intersect with any Chinese character, and that the pixels located at the horizontal lines are all background. In addition, these figures show that the smooth and continuous variation of the gray levels of the pixels holds true in the x direction, even though the range of variation in this direction is also great.

From this phenomenon of smooth and continuous variation of the background pixels, it is apparent that the instability or variation caused in the background pixels by the non-ideal illumination is limited and predictable to a certain degree. Although not intended to limit the scope of this invention, the phenomenon is useful for creating dynamic thresholds for deciding whether a pixel is a background or object pixel.

The invention therefore provides a method for determining whether a digitized image data pixel is an object or background pixel which takes into account the variability of the pixels surrounding the pixel and establishes a dynamic threshold based thereon. As described herein, the method of the invention includes steps of:

assuming the pixel whose status is being determined to be background;

distinguishing, by taking the gray-level of a preceding pixel located in a first direction relative to the pixel as a reference, whether the pixel is in a static or transient state;

setting a static state pixel threshold and a transient state pixel threshold;

adjusting the static state pixel and transient state pixel thresholds according to a variation in gray-level in the first direction;

determining the pixel to be a background pixel or an object pixel according to the static state threshold, if the pixel is in a static state; and determining the pixel to be a background pixel or an object pixel according to the transient state threshold, if the pixel is in a transient state.

The above and other objects and advantages of the present invention may be clearly understood from the detailed description by referring to the following drawings.

BRIEF DESCRIPTION OF THE DRAWINGS

FIG. 2(a) shows an image obtained under natural illumination and FIG. 2(b) shows the distribution of gray levels of pixels at a certain horizontal line of the image of FIG. 2(a).

FIG. 3(a) shows another image obtained under natural illumination and FIG. 3(b) shows the distribution of gray levels of pixels at a certain horizontal line of the image of FIG. 3(a).

FIG. 4(a) shows an image obtained from a document and FIG. 4(b) shows the edges of the text characters in FIG. 4(a).

FIG. 5 illustrates a diagram of the f function and the r function in a preferred embodiment of this invention.

FIG. 17 contains a table I showing the mean gray-levels, standard deviations, X_DFD(i) and i figures of 18 images along the x axis.

FIG. 18 shows the mean gray-levels, standard deviations, Y_CFD(i) and i figures of 18 images along the y axis.

DETAILED DESCRIPTION OF THE PREFERRED EMBODIMENTS

Figure 16:
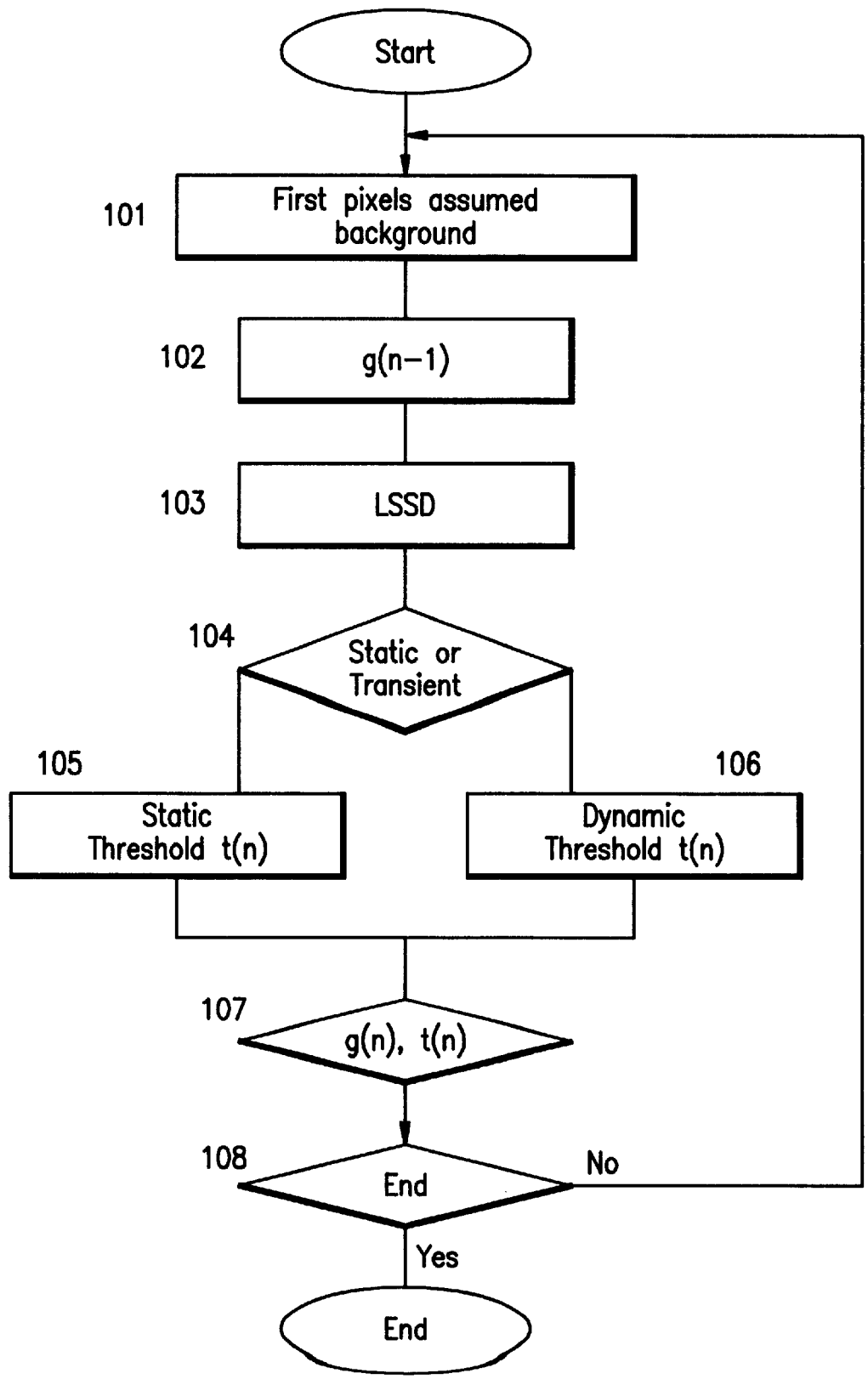
FIG. 16 illustrates the flow chart of the method of this invention.

The following is a description of a method according to the invention for determining whether a digitized image data pixel is an object pixel or a background pixel. FIG. 16 is a flow chart detailing the steps of the method of the preferred embodiment. As shown in this figure, the method of this invention includes the following steps: At 101, a first pixel is assumed to be background. The "first pixel" in this invention can be the pixel at the most upper left corner of the coordinate. In the determination of a pixel to be background or object, at 102, the gray level of its preceding pixel g(x,y-1) or g(x-1,y) is found. At 103 an upper limit for the deviation of the gray-level of the pixels (LSSD) is decided. At 104, if the deviation of gray-levels of two adjacent pixels (horizontally or vertically) is smaller than LSSD, the pixel is deemed in the "static state." Otherwise, it is deemed in the "transient state." If the pixel is in the static state, at 105, a static threshold t(n) is set according to the formula t(n)=t(n−1)+[g(n)-g(n−1)], where g(n) represents the gray-level of pixel n. If the pixel is in the transient state, at 106, a dynamic threshold t(n) is set according to the formula $$t(n)=t(n-1)+f(g(n), g(n-1), t(n-1))\times|g(n)-g(n-1)|,$$

where g(n) represents the gray-level of the pixel and $$f(g(n), g(n-1), t(n-1))=S\times\tan^{-1} R(n),$$

where $$R(n) = \frac{g(n) - g(n-1)}{g(n-1) - t(n-1)},$$

and where S is a normalization factor such that $|S\times\tan^{-1} R(n)|<1$.

At 107 the gray-level of the pixel g(n) is compared with the applicable threshold t(n). If g(n)≦t(n), the pixel is considered to be an object pixel. Otherwise, it is considered to be a background pixel.

At 108 the steps of 101 to 107 are processed from a different direction so that more accurate results may be obtained.

The following is a description of an exemplary preferred embodiment of the above-described method:

a) Determining a pixel to be in a dynamic state or in a transient state

Assuming that the size of an image obtained by an image scanner is N(pixels)*N(pixels). In the x direction the gray-levels of each two adjacent pixels at a horizontal line define the following function X_GDIF:

$$X\_GDIF(x,y)=|g(x,y)-g(x,y-1)| \qquad (2)$$

where

X: 1,2,3, . . . , N-1;

Y: 0,1,2, . . . , N-1; and g(x,y) is the gray level of pixel (x,y).

In a similar way, the gray-levels of two adjacent pixels in the y direction at a vertical line defines the following function Y_GDIF:

$$Y\_GDIF(x,y)=|g(x,y)-g(x,y-1)| \qquad (3)$$

where

X: 0,1,2, . . . , N-1;

Y: 1,2,3, . . . , N-1; and g(x,y) is the gray level of pixel (x,y).

Given the fact that:

NX(i) is the number of pixels where X_GDIF(x,y)=i;

NY(i) is the number of pixels where Y_GDIF(x,y)=i; then

M=N*(N-1) is the number of pixels that can be located in X_GDIF and Y_GDIF.

Thus, the ratio of the number of pixels where X_GDIF(x,y)≦i to M(X_CFD) may be expressed by the following equation:

$$X\_CFD(i) = \sum_{k=0}^{i} NX(k)/M \qquad (4)$$

If, in a computerized image, 8 bits are used to represent the gray levels of a pixel, i=0, 1, 2, . . . , 255, wherein lower levels represent darker pixels and vice versa. For the same reason, another function YCFD can be defined as follows:

$$Y\_CFD(i) = \sum_{k=0}^{i} NX(k)/M \qquad (5)$$

where i=0, 1, 2, . . . , 255.

For all image files, the pixels located at the edges of the image (the object) are only a relatively small portion of all pixels of that image file. In FIG. 4(*b*), the white pixels represent the pixels located at the edge of the characters shown in FIG. 4(*a*). As shown in this figure, the ratio of the edge pixels to all of the object (character) pixels is about 25%. Likewise, the proportion of the background pixels plus the non-edge, object pixels to the whole pixels of the image file is about 75%. As a result, once the i value is found, where X_GDIF(x,y)≦i or Y_GDIF(x,y)≦i, 0≦i≦255 such that X_CFD(i)=75% or Y_CFD(i)=75%, this i value can be used as a reference in the processing of the image.

Initially, an analysis of the variation of the gray-levels of the background pixels plus the non-object pixels of average images is conducted. Tables I and II contained in FIGS. 17 and 18, respectively, show the results of such an analysis for 18 test images, with the average gray-levels, standard deviations, the "i" values, and X_CFD(i) and Y_CFD(i), all of individual images. Here, the i value represents the sum of the average gray-level plus three times the standard deviation, as rounded to the nearest integral number. The values of X_CFD(i) and Y_CFD(i) are determined by the related i value. The average values of the "average gray-levels", the standard deviations and the i values are listed at the bottom of the Tables. These results an applicable i value to be obtained for the processing of certain other samples.

As shown in the Tables, if i is determined as described above, typically 75%<X_CFD(i)≦79% and 75%≦Y_CFD(i)≦79%. Under such an i value, the proportion of the background pixels plus the non-edge, object pixels will not be less than 75% the total amount of pixels of the image file. As a result, this i value can be used as an indication of the effects of non-ideal illumination of the image. In the following description, "LSSD" stands for "the largest static-state deviation of gray levels" of an image file to represent the i value. Usually the LSSD can be taken as to be between 4 and 9, and in particular 6 (referring to Tables I and II).

Based on such an LSSD value, the pixels of the image to be processed can be divided into two groups: pixels in the "static state" and pixels in the "transient state", as follows:

1. If X_GDIF(x,y)≦LSSD (or Y_GDIF(x,y)≦LSSD), pixel (x,y) is deemed to be in the static state; and
2. If X_GDIF(x,y)≦LSSD (or Y_GDIF(x,y)≦LSSD), pixel (x,y) is deemed to be in the transient state.

After the threshold LSSD for deciding whether a pixel is in the static state or a transient state has been determined, whether the pixel is a background or object pixel can be determined according to a respective static threshold or a dynamic threshold, as follows:

b) Determining Static Thresholds for Pixels in the Static State

Because LSSD is a statistical value, it is adjusted before it is applied to all of the pixels of a specific image. In practice, in order to accelerate the processing, image data is input from a raster scanner and pipeline processing is adopted to reduce the processing time. In this case, the value of LSSD, which is at least applicable to a certain amount of pixels, is decided before the pixels are processed. As a result, only a portion of the pixels, but not all the pixels of the entire image, need to be taken into consideration in deciding the value of LSSD. For instance, when an LSSD of a specific scan line (usually a horizontal or a vertical line) is to be determined, a continuous section of pixels in that scan line can be used to calculate a "local" LSSD. This LSSD, in turn, can be used as a reference to decide the LSSD of the following section of scan line.

In deciding the local LSSD, the LSSD for a 256 level gray-scale image is first set at a value between 4 and 9, such as 6, to provide an initial local LSSD. If the gray-level of a pixel at position n of a horizontal scan line is g(n), for the case of a local LSSD, the pixel n is treated as being in the static state and whether it is a background pixel or a object pixel is decided according to a "static" threshold.

The "static" threshold in this invention is not a fixed value, but rather varies along the scan line, with the static threshold t(n) of pixel n along the scan line being adjusted according to the following equation:

$$t(n)=t(n-1)+[g(n)-g(n-1)] \qquad (6)$$

In practice, t(0) is always set to 0.

c) Determining Dynamic Thresholds for Pixels in the Transient State

Continuing from the above, when $|g(n)-g(n-1)|>$the local LSSD, the pixel is treated as being in the "transient state". Whether a pixel in the transient state is an object or background pixel is decided according to "dynamic thresholds". Pixels in the transient state include those with gray-levels that have dramatic changes, in comparison with their adjacent pixels. Such pixels include: pixels at edges of a character and those attributable to noise, poor printing quality, and poor paper quality. The thresholds applicable in the transient state are used to pick up the pixels at edges of a character.

When the image is obtained from an image scanner under pipeline processing, the following information about pixels of the image is available:
1. g(n): the gray level of the pixel;
2. g(n−1): the gray level of its preceding pixel; and
3. t(n−1): the threshold to determine whether its preceding pixel is a background or object pixel.

Thus, the threshold of the pixel can be decided according to the following equation:

$$t(n)=t(n-1)+f(g(n), g(n-1), t(n1)) \times |g(n)-g(n-1)| \qquad (7)$$

Although it is not intended to limit the scope of this invention, the reason the f function is used in this equation can be understood by the following: In order to locate the edges of the characters in an image, where the gray-level of the pixels undergo dramatic changes, the variation (adjustment) of the threshold does not change along with the gray-levels of the pixels. However, due to the natural illumination, it is possible that minor discrepancies in gray-levels can be found in an object pixel and its adjacent pixel. In order to locate the edges of two adjacent characters, even if one is of high contrast and the other is of low contract, it is necessary to define the f function in direct proportion to $g(n)-g(n-1)$ and in inverse proportion to $|g(n)-t(n-1)|$, as follows:

$$R(n) = \frac{g(n)-g(n-1)}{g(n-1)-t(n-1)}. \qquad (8)$$

Here, $f \propto R(n)$ and $0<|f(g(n),g(n-1),t(n-1))|<1$.

Also, in order to eliminate some minor noise, the f functions of two adjacent pixels n1 and n2 are deemed to have the following characteristics:

If $|R(n1)| < |R(n2)|$, $$\left|\frac{df}{dR}\right|_{n=n1} > \left|\frac{df}{dR}\right|_{n=n2}$$

FIG. 5 shows the value of the f function in relating to the value of R(n). As shown in this figure, the curve of the f function is a curve of a $\tan^{-1}$ function. Accordingly, the f function may be defined as follows:

$$f(g(n), g(n-1), t(n-1))=S \times \tan^{-1} R(n) \qquad (9)$$

so that $$t(n)=t(n-1)+S \times [\tan^{-1} R(n)] \times |g(n)-g(n-1)|$$

and S is a normalization factor such that $$|S \times \tan^{-1} R(n)|<1.$$

As the threshold t(n) is decided according to the dramatic changes in gray-levels, it can be called "dynamic" thresholds.

Figure 1:
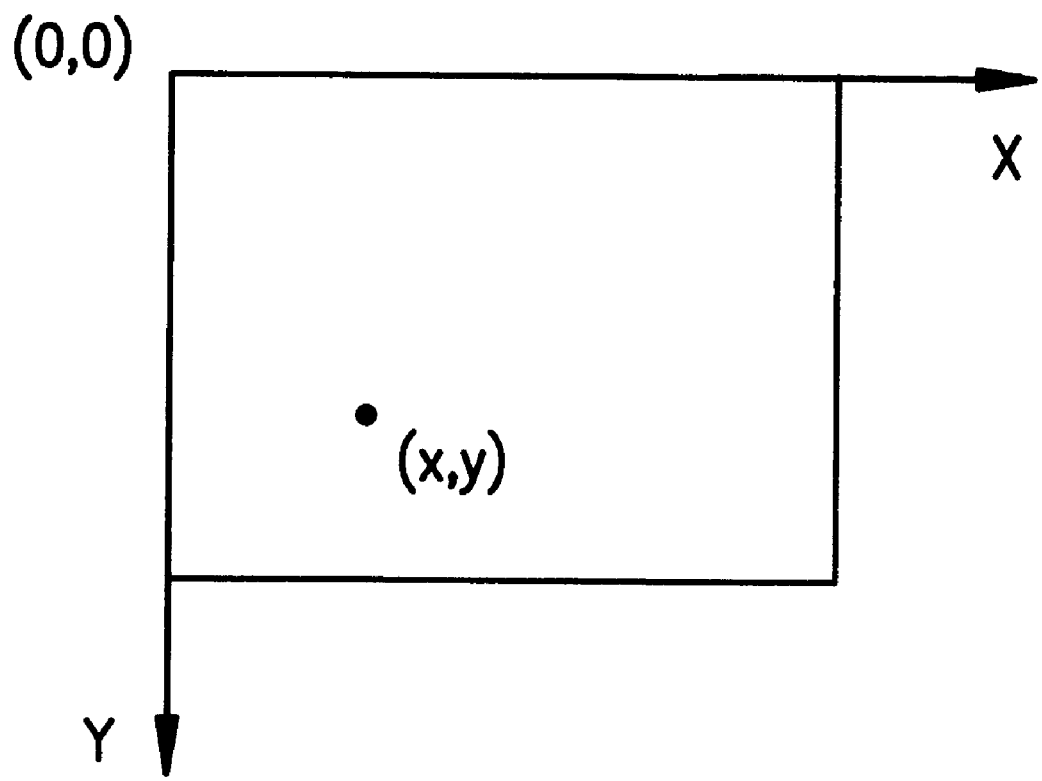
FIG. 1 shows a two-dimensional coordinate system.
Figure 6A:
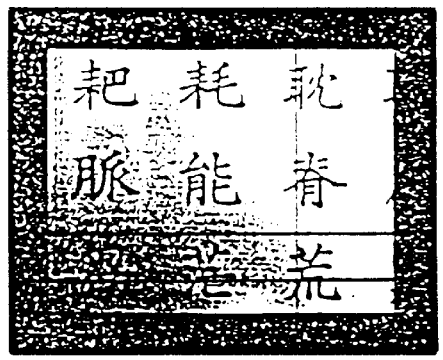
FIG. 6(a) shows an image obtained under natural illumination.
Figure 6B:
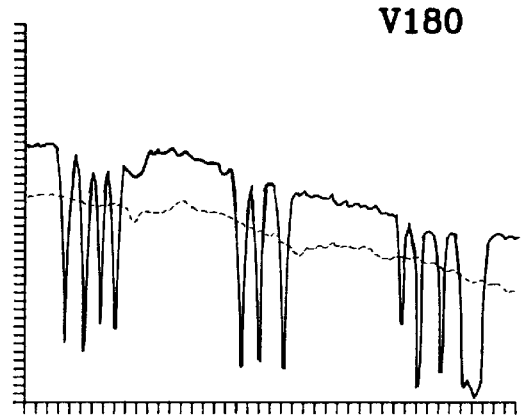
FIG. 6(b) shows the distribution of gray levels of the pixels at a certain vertical position of FIG. 6(a)
Figure 6C:
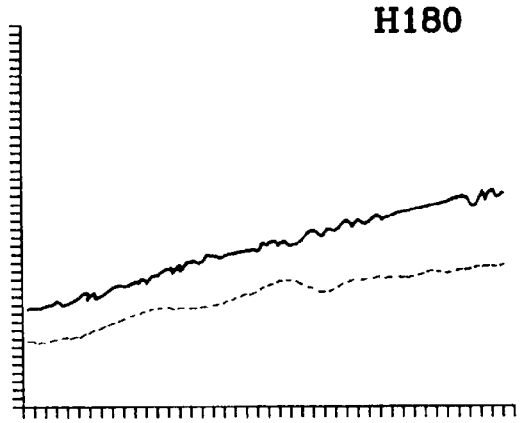
FIG. 6(c) shows the distribution of gray levels of the pixels at a certain horizontal position of FIG. 6(a) and FIG. 6(d) shows the distribution of gray levels of the pixels at another horizontal position of FIG. 6(a).
Figure 6D:
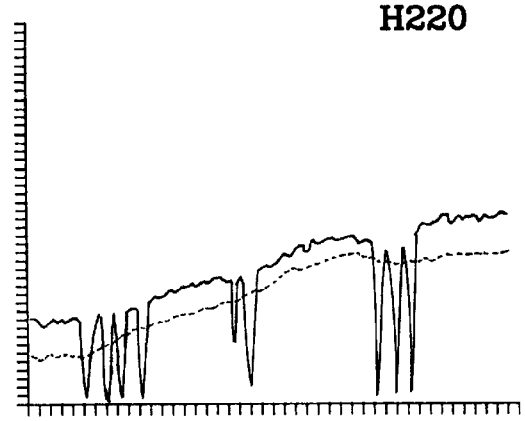
Figure 7A:
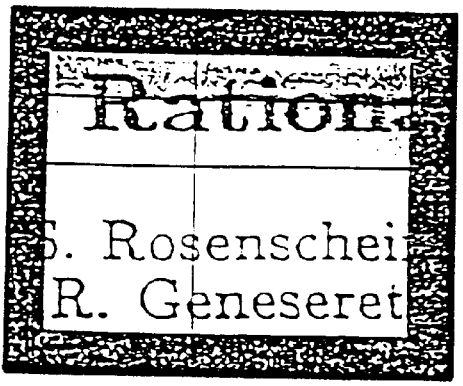
FIG. 7(a) shows another image obtained under natural illumination.
Figure 7B:
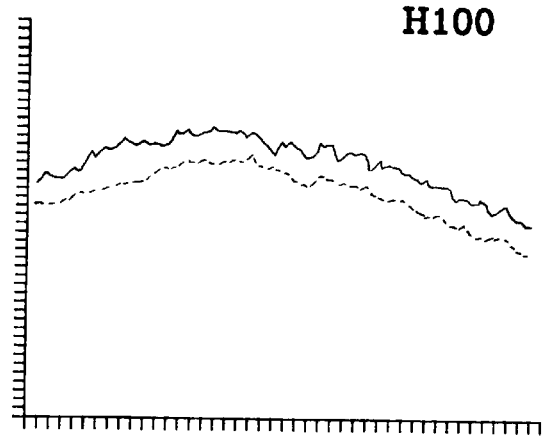
FIG. 7(b) shows the distribution of gray levels of the pixels at a certain horizontal position of FIG. 7(a)
Figure 7C:
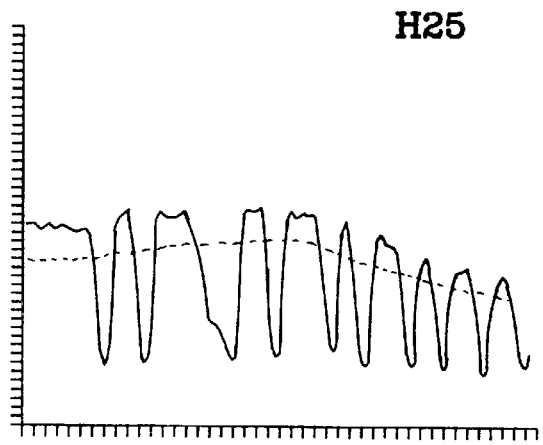
FIG. 7(c) shows the distribution of gray levels of the pixels at another horizontal position of FIG. 7(a) and FIG. 7(d) shows the distribution of gray levels of the pixels at a certain vertical position of FIG. 7(a).
Figure 7D:
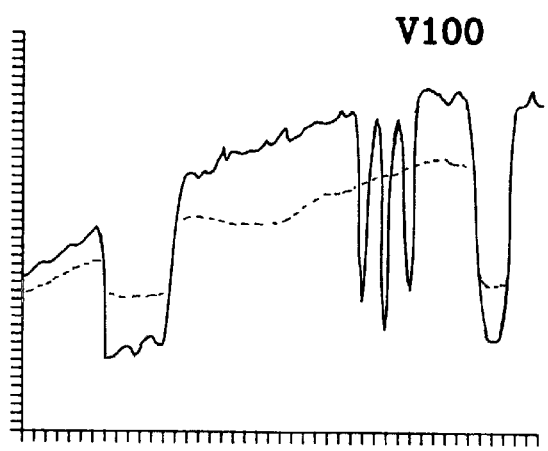
Figure 8A:
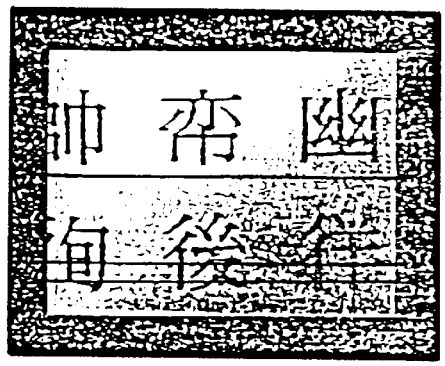
FIG. 8(a) shows another image obtained under natural illuminations.
Figure 8B:
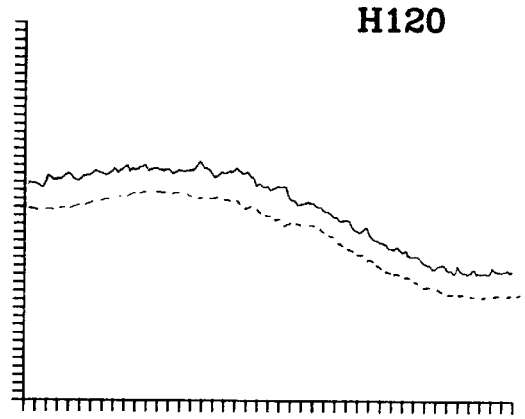
FIG. 8(b) shows the distribution of gray levels of the pixels at a certain horizontal position of FIG. 8(a)
Figure 8C:
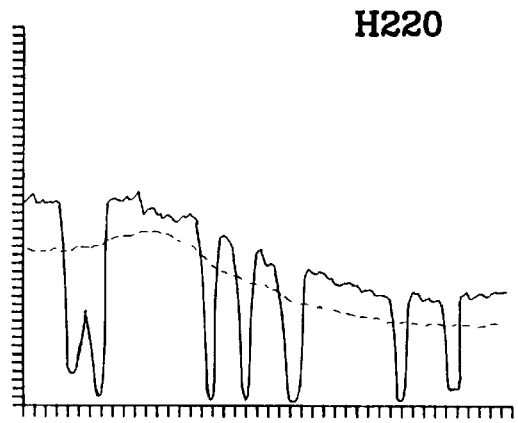
FIG. 8(c) shows the distribution of gray levels of the pixels at another horizontal position of FIG. 8(a) and FIG. 8(d) shows the distribution of gray levels of the pixels at a third horizontal position of FIG. 8(a).
Figure 8D:
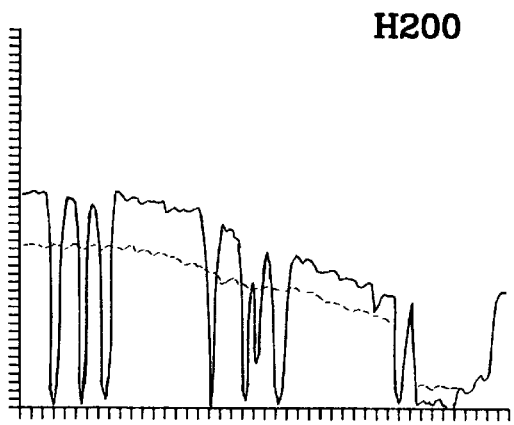
Figure 9A:
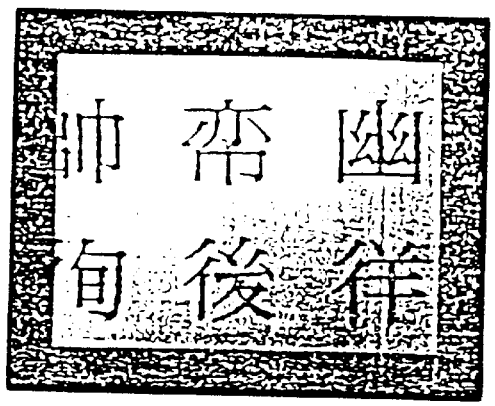
FIG. 9(a) shows an image obtained under natural illumination.
Figure 9B:
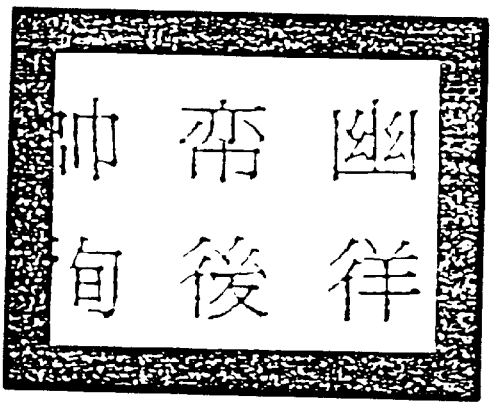
FIGS. 9(b)–9(d) show the results of processing by the method of this invention in different directions.
Figure 9C:
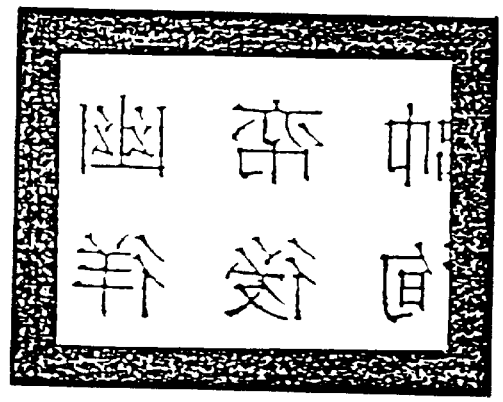
Figure 9D:
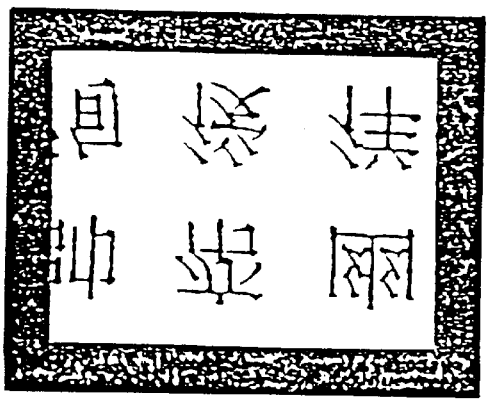
Figure 9E:
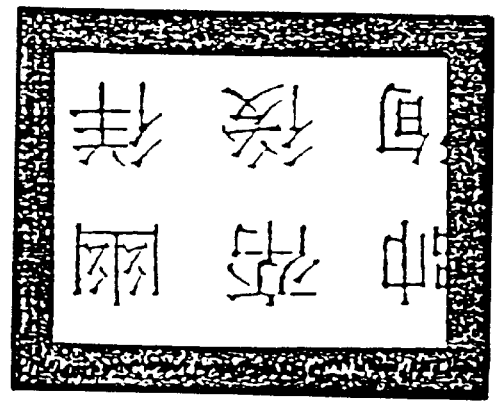
Figure 10A:
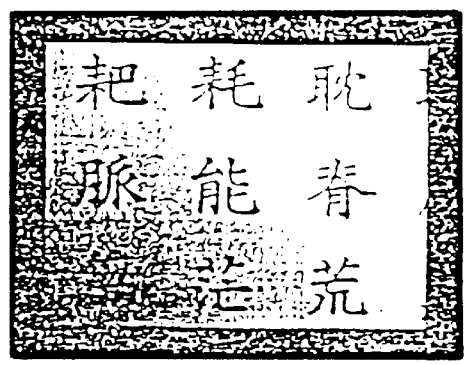
FIG. 10(a) shows another image obtained under natural illumination.
Figure 10B:
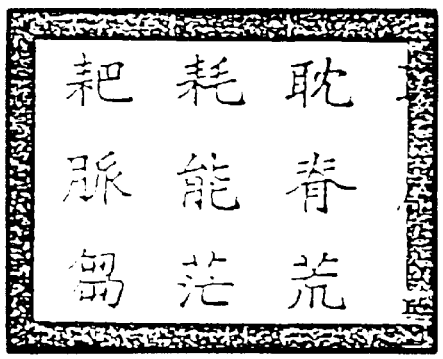
FIGS. 10(b)–10(d) shows the results of processing by the method of this invention in different directions.
Figure 10C:
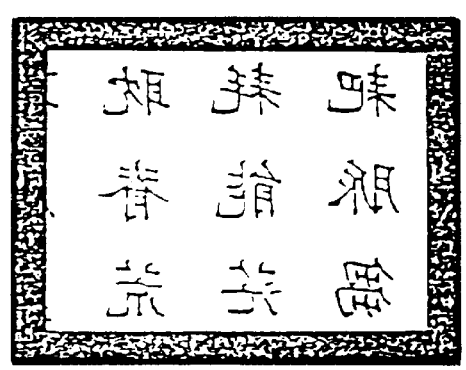
Figure 10D:
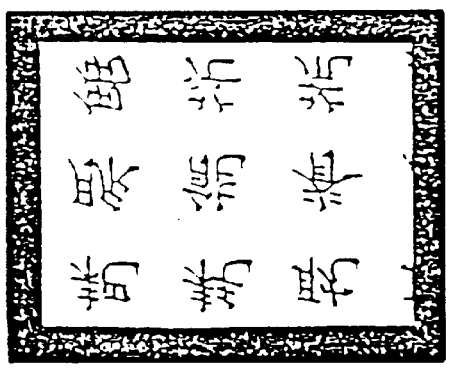
Figure 10E:
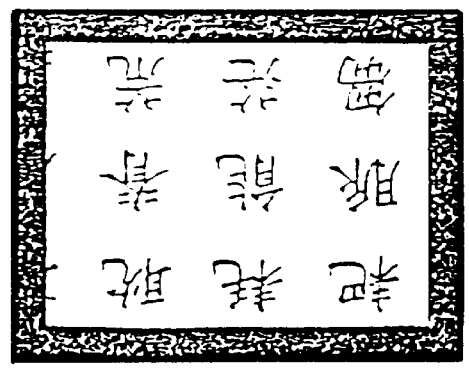
Figure 11A:
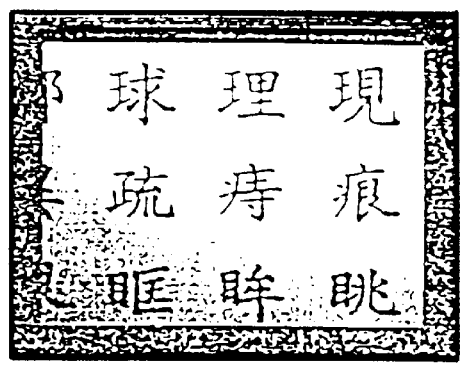
FIG. 11(a) shows a third image obtained under natural illumination.
Figure 11B:
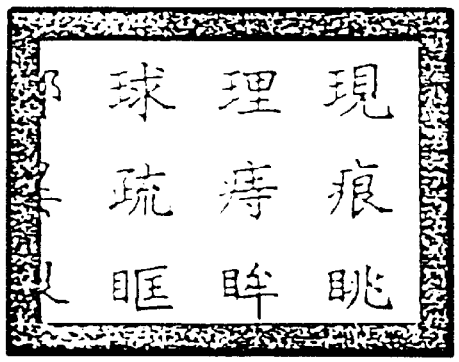
FIGS. 11(b)–11(d) shows the results of processing by the method of this invention in different directions.
Figure 11C:
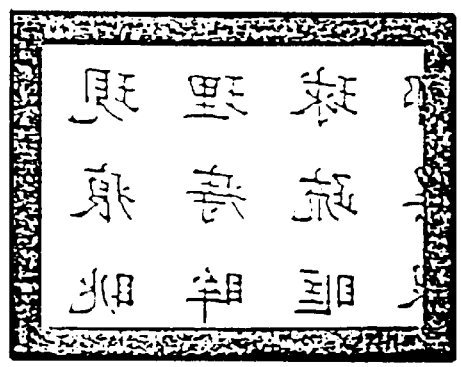
Figure 11D:
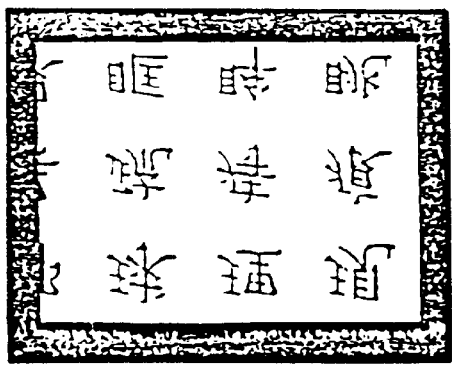
Figure 11E:
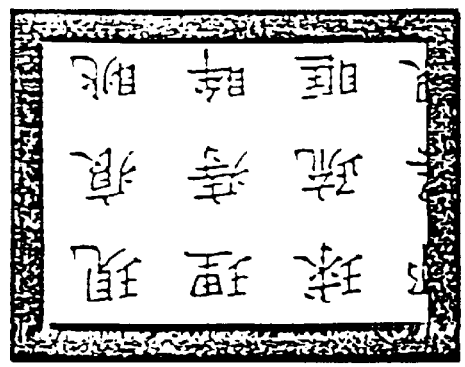
Figure 12A:
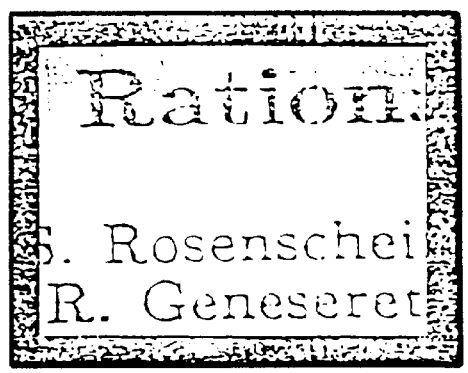
FIG. 12(a) shows a fourth image obtained under natural illumination.
Figure 12B:
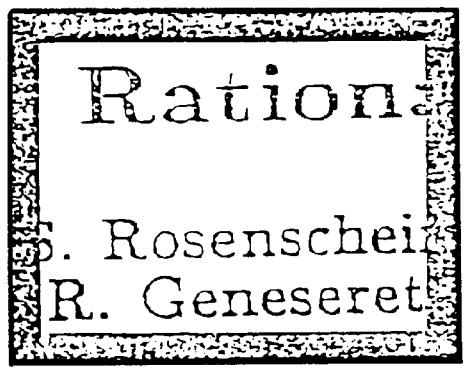
FIGS. 12(b)–12(d) shows the results of processing by the method of this invention in different directions.
Figure 12C:
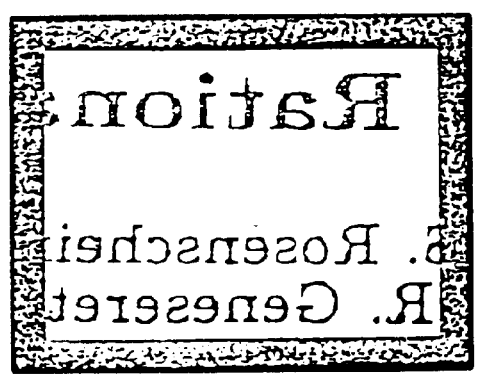
Figure 12D:
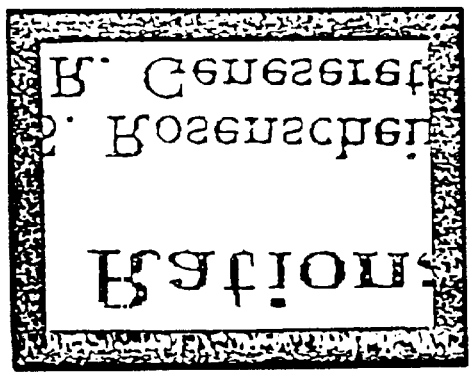
Figure 12E:
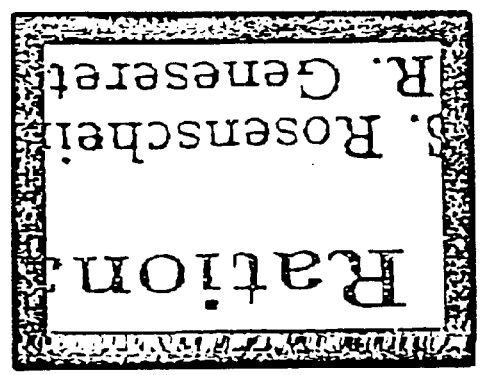

FIGS. 6(a), 7(a) and 8(a) show three images obtained from an image scanner. FIGS. 6(b)–(d), 7(b)–(d) and 8(b)–(d) show the gray levels of the pixels at certain horizontal or vertical lines (the solid lines) and the thresholds applicable to the individual pixels (the dotted lines). These figures clearly show that the thresholds so decided can accurately determine whether a pixel is an object or background pixel.

d) Determining Thresholds from Different Directions

As the static thresholds and the dynamic thresholds are decided according to the preceding steps, the thresholds are used to determine whether a pixel is a background or object pixel. If the gray-level of a pixel is lower than the applicable threshold, it is deemed to be an object pixel. Otherwise, it is deemed to be a background pixel.

Where the image to be processed is in the form of two-dimensional image data, it is preferable if the determination is conducted from both the horizontal and the vertical directions so that improved results may be obtained.

When a pixel is processed from both the horizontal and the vertical directions, at least two thresholds are obtained. The two thresholds are the threshold from the horizontal direction TH(x,y) and the threshold from the vertical direction TV(x,y). Supposing the gray-level of the pixel is g(x,y) and the result of processing (determination) is b(x,y), b(x,y) can be decided according to the following:

1. If $g(x,y) \leq TH(x,y)$ and $g(x,y) \leq TV(x,y)$, then $b(x,y)=0$; i.e., the pixel is an object pixel.
2. If $g(x,y)>TH(x,y)$ and $g(x,y)>TV(x,y)$, then $b(x,y)=1$; i.e., the pixel is a background pixel.
3. When $g(x,y) \leq TH(x,y)$ and $g(x,y)>TV(x,y)$: If $TH(x,y)-g(x,y)<g(x,y)-TV(x,y)$, then $b(x,y)=1$; i.e., the pixel is background; If $TH(x,y)-g(x,y) \geq g(x,y)-TV(x,y)$, then $b(x,y)=0$; i.e., the pixel is an object pixel.
4. When $g(x,y)>TH(x,y)$ and $g(x,y) \leq TV(x,y)$: If $TV(x,y)-g(x,y) \leq g(x,y)-TH(x,y)$, then $b(x,y)=1$; i.e., the pixel is a background pixel; If $TV(x,y)-g(x,y) \geq g(x,y)-TH(x,y)$, $b(x,y)=0$; i.e., the pixel is an object pixel.

According to statistical data, the first pixel, i.e., the pixel at the upper left corner of an image, is always background. As a result, the first pixel is assumed to be background. Thus we have: $TV(0,0)=TH(0,0)=0.8*g(0,0)$ and $b(0,0)=1$.

Figure 13A:
FIG. 13(a) shows a fingerprint obtained under natural illumination.
Figure 13B:
FIG. 13(b) shows the image after it has been processed by the method of this invention.
Figure 14A:
FIG. 14(a) shows another fingerprint obtained under natural illumination.
Figure 14B:
FIG. 14(b) shows the image after it has been processed by the method of this invention.
Figure 15A:
FIG. 15(a) shows a third fingerprint obtained under natural illumination.
Figure 15B:
FIG. 15(b) shows the image after it has been processed by the method of this invention.

FIGS. 9(a), 10(a), 11(a) and 12(a) show several images obtained from an image scanner under natural illumination. FIGS. 9(b)–(d), 10(b)–(d), 11(b)–(d) and 12(b)–(d) show results of processing under the method of this invention, from four different directions. FIGS. 13(a), 14(a) and 15(a) show several fingerprints obtained from an image scanner under natural illumination. FIGS. 13(b), 14(b), and 15(b) show results of processing under the method of this invention. As clearly shown in the figures, the present invention is useful to overcome the drawbacks brought by natural illumination.

The above description illustrates only the spirit of this invention. Those skilled in the art will be able to make various modifications and improvements within the spirit of this invention, but all such modifications and improvements shall come under the scope of the present invention.

What is claimed is:

1. A method of using a computer system to determine whether digitized pixels of an image are background or object pixels, comprising the steps of:

assuming a first pixel to be background;

distinguishing, by taking the gray-level of a preceding pixel located in a first direction relative to the pixel as a reference, whether the pixel is in a static or a transient state;

setting a static threshold if the pixel is in a static state;

setting a dynamic threshold if the pixel is in a transient state;

adjusting the static threshold or the dynamic threshold according to a variation in gray-level in said first direction;

determining said pixel to be a background pixel or an object pixel according to the static threshold, if said pixel is in a static state; and determining said pixel to be a background pixel or an object pixel according to the dynamic threshold, if said pixel is in a transient state, wherein said step of distinguishing whether the pixel is in a static or transient state comprises the steps of:

setting an upper limit of the gray-level deviation (LSSD);

comparing a gray-level deviation of two horizontally or vertically adjacent image pixels with said LSSD, and;

determining said pixels to be in a transient state when the gray-level deviation of said adjacent pixels is greater than said LSSD, and in a static state when the gray-level deviation of said adjacent pixels is smaller than said LSSD, and wherein said LSSD is between 4 and 9 when a pixel gray-level is divided into 256 levels.

2. The method as claimed in claim 1, wherein said LSSD is 6 when the pixel gray-level is divided into 256 levels.

3. A method of using a computer system to determine whether digitized pixels of an image are background or object pixels, comprising the steps of:

assuming a first pixel to be background;

distinguishing, by taking the pray-level of a preceding pixel located in a first direction relative to the pixel as a reference, whether the pixel is in a static or a transient state;

setting a static threshold if the pixel is in a static state;

setting a dynamic threshold if the pixel is in a transient state;

adjusting the static threshold or the dynamic threshold according to a variation in gray-level in said first direction;

determining said pixel to be a background pixel or an object pixel according to the static threshold, if said pixel is in a static state; and determining said pixel to be a background pixel or an object pixel according to the dynamic threshold, if said pixel is in a transient state, wherein the step of setting said static state pixel threshold comprises the steps of:

setting an upper limit of gray-level deviation between two adjacent pixels which are both background or object pixels; and using said upper limit as a threshold for deciding whether a pixel is a background or object pixel.

4. The method as claimed in claim 3, wherein the step of adjusting the threshold of a pixel comprises the step of adding the threshold of the preceding pixel to the gray-level deviation between said pixel and the pixel preceding it.

5. The method as claimed in claim 3, wherein the step of setting said transient state pixel threshold comprises the steps of:

setting an upper limit of gray-level deviation between two adjacent pixels which are either both background or both object pixels; and using said upper limit as a threshold for determining whether a pixel is a background or object pixel.

6. The method as claimed in claim 5, wherein the step of adjusting said threshold comprises the steps of multiplying by an adjusted factor an absolute value of a difference between the gray-levels of said pixel and the pixel preceding said pixel, and then adding a result of the multiplication to the threshold of the preceding pixel, thereby obtaining the threshold value of said pixel.

7. A method of using a computer system to determine whether digitized pixels of an image are background or object pixels, comprising the steps of:

assuming a first pixel to be background;

distinguishing, by taking the gray-level of a preceding pixel located in a first direction relative to the pixel as a reference, whether the pixel is in a static or a transient state;

setting a static threshold if the pixel is in a static state;

setting a dynamic threshold if the pixel is in a transient state;

adjusting the static threshold or the dynamic threshold according to a variation in gray-level in said first direction;

determining said pixel to be a background pixel or an object pixel according to the static threshold, if said pixel is in a static state; and determining said pixel to be a background pixel or an object pixel according to the dynamic threshold, if said pixel is in a transient state, wherein the step of setting said transient state pixel threshold comprises the steps of:

setting an upper limit of gray-level deviation between two adjacent pixels which are either both background or both object pixels; and using said upper limit as a threshold for deciding whether a pixel is a background or object pixel, wherein the step of adjusting said threshold comprises the steps of multiplying by an adjusted factor an absolute value of a difference between the gray-levels of said pixel and the pixel preceding said pixel, and then adding a result of the multiplication to the threshold of the preceding pixel, thereby obtaining the threshold value of said pixel, and wherein said adjusted factor includes a function f, defined as follows:

$$f(n) = S * \tan-1 R(n),$$

wherein $$R(n) = \left| \frac{g(n) - g(n-1)}{g(n-1) - t(n-1)} \right|,$$

where $g(n)$ is the gray-level value of pixel number n, $t(n-1)$ is the threshold of pixel number n−1, and S is a normalization factor, such that $|S \times \tan^{-1} R(n)| < 1$.

8. The method as claimed in claim 3, further comprising the steps of defining from a second direction a threshold for determining whether the pixel is a background or object pixel, and determining whether the pixel is a background or object pixel according to the thresholds defined from both the first and second directions.

9. A method of using a computer system to determine whether digitized pixels of an image are background or object pixels, comprising the steps of:

assuming a first pixel to be background;

distinguishing, by taking the gray-level of a preceding pixel located in a first direction relative to the pixel as a reference, whether the pixel is in a static or a transient state;

setting a static threshold if the pixel is in a static state;

setting a dynamic threshold if the pixel is in a transient state;

adjusting the static threshold or the dynamic threshold according to a variation in gray-level in said first direction;

determining said pixel to be a background pixel or an object pixel according to the static threshold, if said pixel is in a static state;

determining said pixel to be a background pixel or an object pixel according to the dynamic threshold, if said pixel is in a transient state;

defining from a second direction a threshold for determining whether the pixel is a background or object pixel; and determining whether the pixel is a background or object pixel according to the thresholds defined from both the first and second directions, wherein said step of determining whether the pixel is a background or object pixel comprises the following steps:

A. determining the pixel to be an object pixel when the gray-level of said pixel $\{g(x,y)\}$ is less than or equal to said first direction threshold $\{T1(x,y)\}$ and said second direction threshold $\{T2(x,y)\}$;

B. determining the pixel to be a background pixel when the gray-level of said pixel $\{g(x,y)\}$ is higher than said first direction threshold $\{T1(x,y)\}$ and said second direction threshold $\{T2(x,y)\}$;

C. determining said pixel to be a background pixel if $T1(x,y)-g(x,y)<g(x,y)-T2(x,y)$, or determining said pixel to be an object pixel if $T1(x,y)-g(x,y)\geq g(x,y)-T2(x,y)$, when said gray-level of said pixel is less than or equal to the first direction threshold but higher than the second direction threshold; and D. determining said pixel to be a background pixel if $T2(x,y)-g(x,y)\leq g(x,y)-T1(x,y)$, or determining said pixel to be an object pixel if $T2(x,y)-g(x,y)>g(x,y)-T1(x,y)$, when said pixel's gray-level is higher than said first direction threshold but lower than or equal to said second direction threshold.

10. The method as claimed in claim 9, wherein said first direction is the horizontal direction of the image in a right-angle coordinate system, and the second direction is the vertical direction of the image data in the right-angle coordinate.

11. The method of claim 3, further comprising the step of converting into background pixels those pixels in the image data determined to be background pixels.

* * * * *